US010123273B2

(12) United States Patent
Kneckt et al.

(10) Patent No.: US 10,123,273 B2
(45) Date of Patent: Nov. 6, 2018

(54) FACILITATING POWER CONSERVATION FOR LOCAL AREA TRANSMISSIONS

(75) Inventors: Jarkko Lauri Sakari Kneckt, Espoo (FI); Päivi Marjut Ruuska, Kristiansand (NO); Ari Hottinen, Espoo (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/360,901

(22) PCT Filed: Dec. 2, 2011

(86) PCT No.: PCT/IB2011/002933
§ 371 (c)(1),
(2), (4) Date: May 27, 2014

(87) PCT Pub. No.: WO2013/079986
PCT Pub. Date: Jun. 6, 2013

(65) Prior Publication Data
US 2014/0321350 A1  Oct. 30, 2014

(51) Int. Cl.
*H04W 52/02* (2009.01)
*H04W 76/28* (2018.01)
(Continued)

(52) U.S. Cl.
CPC ... *H04W 52/0235* (2013.01); *H04W 52/0206* (2013.01); *H04W 52/0229* (2013.01);
(Continued)

(58) Field of Classification Search
CPC ......... H04W 52/0235; H04W 52/0206; H04W 48/16; H04W 16/14
See application file for complete search history.

(56) References Cited

U.S. PATENT DOCUMENTS

2007/0110017 A1* 5/2007 Fulknier ................. H04L 45/00
370/338
2007/0230396 A1* 10/2007 Watanabe ........... H04L 25/0212
370/329
(Continued)

FOREIGN PATENT DOCUMENTS

CN    101485151 A    7/2009
CN    102142875 A    8/2011
(Continued)

OTHER PUBLICATIONS

International Search Report received for corresponding Patent Cooperation Treaty Application No. PCT/IB2011/002933 dated Dec. 5, 2012, 11 pages.
(Continued)

*Primary Examiner* — Romani Ohri
(74) *Attorney, Agent, or Firm* — Mintz Levin Cohn Ferris Glovsky and Popeo, P.C.

(57) ABSTRACT

An apparatus for triggering generation of a service period(s) in a network may include a processor and memory storing executable computer program code that cause the apparatus to at least perform operations including triggering generation of at least one service period in a first network based in part on receipt of information from a network device of a second network. The computer program code may further cause the apparatus to enable wake up, based in part on the generated service period, of one or more devices of the first network for communication of content to at least one of the devices during a specified time period of the service period. Corresponding methods and computer program products are also provided.

20 Claims, 13 Drawing Sheets

(51) Int. Cl.
*H04W 84/18* (2009.01)
*H04W 68/12* (2009.01)
*H04W 76/23* (2018.01)

(52) U.S. Cl.
CPC ............ *H04W 76/28* (2018.02); *H04W 68/12* (2013.01); *H04W 76/23* (2018.02); *H04W 84/18* (2013.01); *Y02D 70/00* (2018.01); *Y02D 70/1224* (2018.01); *Y02D 70/1242* (2018.01); *Y02D 70/1262* (2018.01); *Y02D 70/142* (2018.01); *Y02D 70/144* (2018.01); *Y02D 70/146* (2018.01); *Y02D 70/164* (2018.01); *Y02D 70/166* (2018.01); *Y02D 70/21* (2018.01); *Y02D 70/22* (2018.01); *Y02D 70/24* (2018.01); *Y02D 70/25* (2018.01)

(56) References Cited

U.S. PATENT DOCUMENTS

| | | | |
|---|---|---|---|
| 2008/0002692 A1* | 1/2008 | Meylan | H04W 72/005 370/390 |
| 2009/0003352 A1 | 1/2009 | Gutknecht et al. | |
| 2009/0124301 A1* | 5/2009 | Raissinia | H04W 52/0216 455/574 |
| 2009/0219846 A1 | 9/2009 | Chan et al. | |
| 2009/0221303 A1* | 9/2009 | Soliman | H04W 52/0274 455/458 |
| 2010/0103878 A1* | 4/2010 | Fujiwara | H04L 67/12 370/328 |
| 2011/0069650 A1 | 3/2011 | Singh et al. | |
| 2011/0216655 A1 | 9/2011 | Chen et al. | |
| 2012/0087279 A1* | 4/2012 | Rinne | H04L 12/2425 370/254 |
| 2012/0122463 A1* | 5/2012 | Chen | H04W 72/082 455/450 |
| 2013/0201954 A1* | 8/2013 | Gao | H04W 72/0413 370/329 |
| 2013/0273907 A1* | 10/2013 | Vikberg | H04W 48/02 455/426.1 |
| 2014/0086131 A1* | 3/2014 | Seok | H04B 7/0452 370/311 |
| 2014/0241315 A1* | 8/2014 | Niu | H04L 67/1091 370/331 |

FOREIGN PATENT DOCUMENTS

| | | |
|---|---|---|
| EP | 1841142 | 10/2007 |
| WO | 2009113557 | 9/2009 |
| WO | 2011/060741 A1 | 5/2011 |
| WO | 2011/094633 A2 | 8/2011 |
| WO | 2013/034948 A1 | 3/2013 |

OTHER PUBLICATIONS

Extended European Search Report received for corresponding European Patent Application No. 11876557.7, dated Jun. 10, 2015, 7 pages.

* cited by examiner

| Power Save Parameters | Delay from schedule message | Awake Window Duration |
|---|---|---|
| Octets: 2 | 2 | 1 |

Table 1: Power Save Setup frame

FIG. 7.

| Service period triggering condition | Triggering mode | Dedicated trigger field | Trigger condition repetition | Service period termination condition | Termination condition repetition |
|---|---|---|---|---|---|
| Bits: 2 | 3 | 1 | 3 | 2 | 3 |
| 0 = The service period in LA is triggered after WA scheduling message | 0 = No service period is triggered, a window for triggering is initiated | 0 = Dedicated trigger field is not used | Every Xth trigger condition triggers a service period | 0 = not present | Every Xth WA termination condition terminates the service period |
| 1 = The service period is triggered after data transmission to base station is completed | 1 = Service period is triggered toward the source of the data | 1= Dedicated trigger field in use | | 1 = Service period terminated at scheduling message of WA | |
| 2= The service period is triggered after possible WA retransmissions are done | 2 = Service period is triggered from the source of the data | | | 2 = Service period is terminated at the beginning of data transmission to WA | |
| 3 = Reserved | 3 = Service period is triggered to and from the source of the data | | | 3 = service period is terminated after special field is transmitted in scheduling message of WA | |
| | 4 = Bi-directional service period used | | | | |

FACILITATING POWER CONSERVATION FOR LOCAL AREA TRANSMISSIONS

RELATED APPLICATION

This application was originally filed as PCT Application No. PCT/IB2011/002933 filed Dec. 2, 2011.

TECHNOLOGICAL FIELD

An example embodiment of the invention relates generally to communication technology and, more particularly, relate to a method, apparatus, and computer program product for optimizing transmissions to conserve power.

BACKGROUND

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer.

Current and future networking technologies continue to facilitate ease of information transfer and convenience to users. Due to the now ubiquitous nature of electronic communication devices, people of all ages and education levels are utilizing electronic devices to communicate with other individuals or contacts, receive services and/or share information, media and other content. One area in which there is a demand to increase ease of information transfer relates to transmissions of data from a wide area (WA) network such as, for example, a telecommunications network to a local area (LA) network.

In this regard, for example, in order to provide easier or faster information transfer and convenience, telecommunication industry service providers are developing improvements to existing networks. In this manner, for example, improvements are being made to the universal mobile telecommunications system (UMTS) terrestrial radio access network (UTRAN). Further, for example, the evolved-UTRAN (E-UTRAN) is currently being developed. The E-UTRAN, which is also known as Long Term Evolution (LTE), is aimed at upgrading prior technologies by improving efficiency, lowering costs, improving services, making use of new spectrum opportunities, and providing better integration with other open standards.

Additionally, telecommunications devices are being developed that connect to radio networks as well as other networks such as local area networks. In this way, a device may be able to offload certain communications from the radio networks to the local area networks, which may serve to alleviate the burden placed on the radio networks. Systems supporting such functionality typically rely on pre-existing local area networks that provide an access point to the Internet. Furthermore, devices operating in these systems generally conduct communications independently without regard to the other devices connected to the same local area network.

At present, devices of local area networks may send and receive data inside the local area network during service periods. Currently, devices of a local area network may need to remain active to listen for a service period being opened for communications with a wide area network. The devices of the local area network may consume excessive power listening for a service period.

Accordingly, it may be desirable to provide a mechanism to more precisely and efficiently trigger service periods and to optimize transmissions of networks to conserve power among devices.

BRIEF SUMMARY

A method, apparatus and computer program product are therefore provided for triggering generation of one or more service periods in a local area network based in part on communications from a wide area network, or an entity which is not part of the local area network. The generated service periods may conserve power of devices communicating in the local area network.

In an example embodiment of the invention a group of devices may be connected to the same base station in a wide area network (also referred to herein as network 2). These devices may create an ad hoc network or D2D (device-to-device) connection together or may be associated with the available local area network (also referred to herein as network 1). To conserve power for data transmissions within the network 1, the devices may use a signal(s) transmitted in network 2 to trigger and terminate the service periods, in network 1, and thus to control their availability to transmit and receive data transmissions. The triggering of the service periods through a signal(s) of network 2 may help to reduce the overall power consumption, simplify the radio operation in the both networks and help to mitigate interference between the networks.

In another example embodiment of invention, the devices may wish to increase the transmission throughput to and from a data network (e.g., the Internet). In this scenario, the network 2 may offer the connection to the data network and devices belonging to a network may transmit other devices traffic to the data network (e.g., Internet). The network 1 may offer local distribution of the data to be transmitted to the data network (e.g., the Internet) (through the network 2) or the data that is received from the data network (e.g., Internet) (through the network 2) to the correct devices. The transmission within network 2 may be optimized (e.g., Cooperative Multi Point (COMP) transmissions) or the devices may transmit data normally, independent from each other. Devices transmitting data in a network 1 (e.g. a local area network) may receive scheduling commands or triggering signals from a network device (e.g., a base station) of a network 2 (e.g. a wide area network) and may share the data among each other. The scheduling commands may be sent intentionally by a device of network 2 to schedule network 1 transmissions or power save. The triggering signals (e.g. a frame, or a bit, or end/start of data transmission in network 2) may be sent by network 2 in normal communication without intentions to schedule network 1 service or power save periods. In this case, the devices of network 1 may have agreed to initiate service or power save periods in network 1 upon receiving a triggering signal from network 2. The scheduling commands or triggering signals may be sent by the network device of the network 2 to the devices of the local area network which may trigger the devices to generate one or more service periods in the local area network. In this regard, the service periods may be triggered between a source device and one or more recipient devices of the local area network.

The generated service periods in network 1 may, but need not, be terminated by messages exchanged in the network 1. Alternatively, in one example embodiment, a new scheduling message sent from a network device (e.g., a base station) of network 2 to devices of a network 1 may terminate a service period(s).

In an example embodiment, a termination condition for the generated service periods may avoid simultaneous network 1 and network 2 transmissions. This may mitigate interference problems among the local area network and the wide area network. Additionally, an example embodiment may reduce the network 1 (e.g. local area network) radio energy consumption by using a network 2 (e.g. wide area network) device to coordinate the wakeup and service time of local area network devices based in part on the triggered service periods.

In another example embodiment, the scheduling commands or triggering signals to initiate or terminate a service or power save period in network 1, may be sent by a coexistence manager. The coexistence manager may be an entity which coordinates the coexistence among networks which operate in the same frequencies. In this example embodiment, the devices of network 1 may or may not be connected to network 2.

In one example embodiment, a method for triggering generation of a service period(s) in a network is provided. The method may include triggering generation of at least one service period in a first network based in part on receipt of information from a network device of a second network. The method may further include enabling wake up, based in part on the generated service period, of one or more devices of the first network for communication of content to at least one of the devices during a specified time period of the service period.

In another example embodiment, an apparatus for triggering generation of a service period(s) in a network is provided. The apparatus may include a processor and memory including computer program code. The memory and the computer program code are configured to, with the processor, cause the apparatus to at least perform operations including triggering generation of at least one service period in a first network based in part on receipt of information from a network device of a second network. The memory and computer program code are configured to, with the processor, cause the apparatus to enable wake up, based in part on the generated service period, of one or more devices of the first network for communication of content to at least one of the devices during a specified time period of the service period.

In another example embodiment, a computer program product for triggering generation of a service period(s) in a network is provided. The computer program product includes at least one computer-readable storage medium having computer-executable program code portions stored therein. The computer-executable program code instructions may include program code instructions configured to trigger generation of at least one service period in a first network based in part on receipt of information from a network device of a second network. The program code instructions may also enable wake up, based in part on the generated service period, of one or more devices of the first network for communication of content to at least one of the devices during a specified time period of the service period.

In another example embodiment, an apparatus for triggering generation of a service period(s) in a network is provided. The apparatus may include means for triggering generation of at least one service period in a first network based in part on receipt of information from a network device of a second network. The apparatus may further include means for enabling wake up, based in part on the generated service period, of one or more devices of the first network for communication of content to at least one of the devices during a specified time period of the service period.

In another example embodiment, a method for triggering generation of a service period(s) in a network is provided. The method may include enabling provision, via a first network, of information to one or more devices of a second network to cause triggering of generation of at least one service period in the second network upon receipt of the information by the devices. The generated service period may wake up devices of the second network for communication of content to the devices during a specified time period of the service period.

In another example embodiment, an apparatus for triggering generation of a service period(s) in a network is provided. The apparatus may include a processor and memory including computer program code. The memory and the computer program code are configured to, with the processor, cause the apparatus to at least perform operations including enabling provision, via a first network, of information to one or more devices of a second network to cause triggering of generation of at least one service period in the second network upon receipt of the information by the devices. The generated service period may wake up devices of the second network for communication of content to the devices during a specified time period of the service period.

In another example embodiment, a computer program product for triggering generation of a service period(s) in a network is provided. The computer program product includes at least one computer-readable storage medium having computer-executable program code portions stored therein. The computer-executable program code instructions may include program code instructions configured to enable provision, via a first network, of information to one or more devices of a second network to cause triggering of generation of at least one service period in the second network upon receipt of the information by the devices. The generated service period may wake up devices of the second network for communication of content to the devices during a specified time period of the service period.

In another example embodiment, an apparatus for triggering generation of a service period(s) in a network is provided. The apparatus may include means for enabling provision, via a first network, of information to one or more devices of a second network to cause triggering of generation of at least one service period in the second network upon receipt of the information by the devices. The generated service period may wake up devices of the second network for communication of content to the devices during a specified time period of the service period.

BRIEF DESCRIPTION OF THE SEVERAL VIEWS OF THE DRAWINGS

Figure 1:
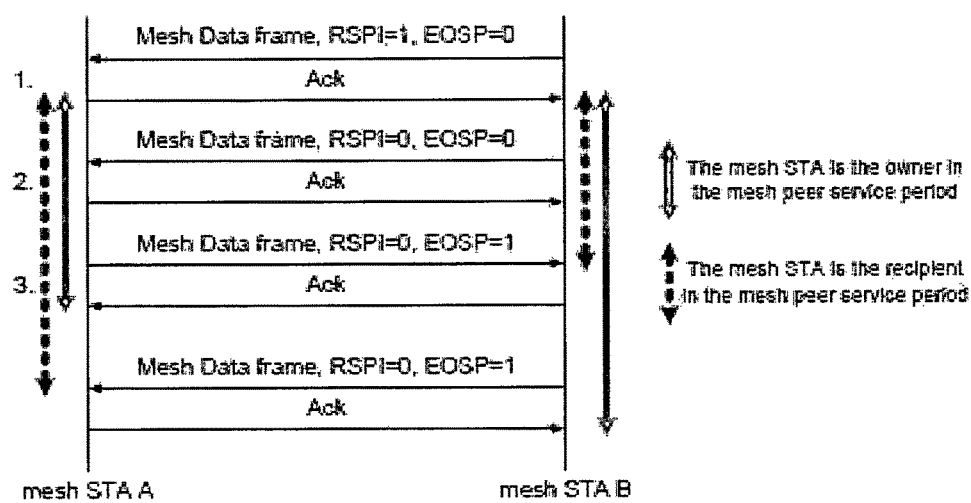
Figure 2:
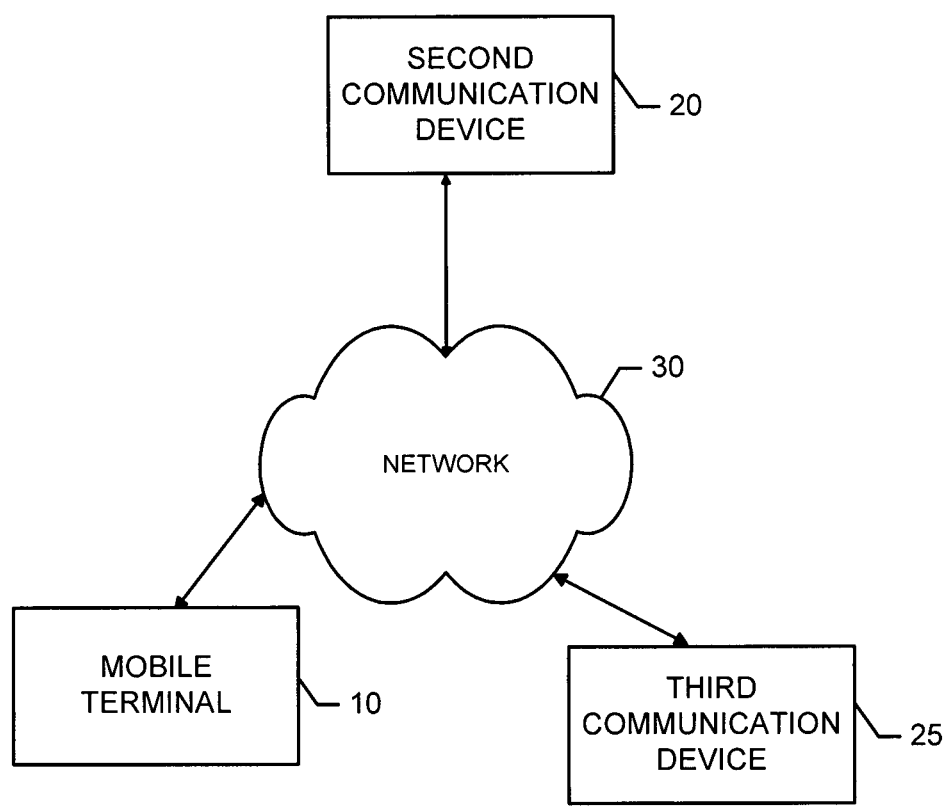
Figure 3:
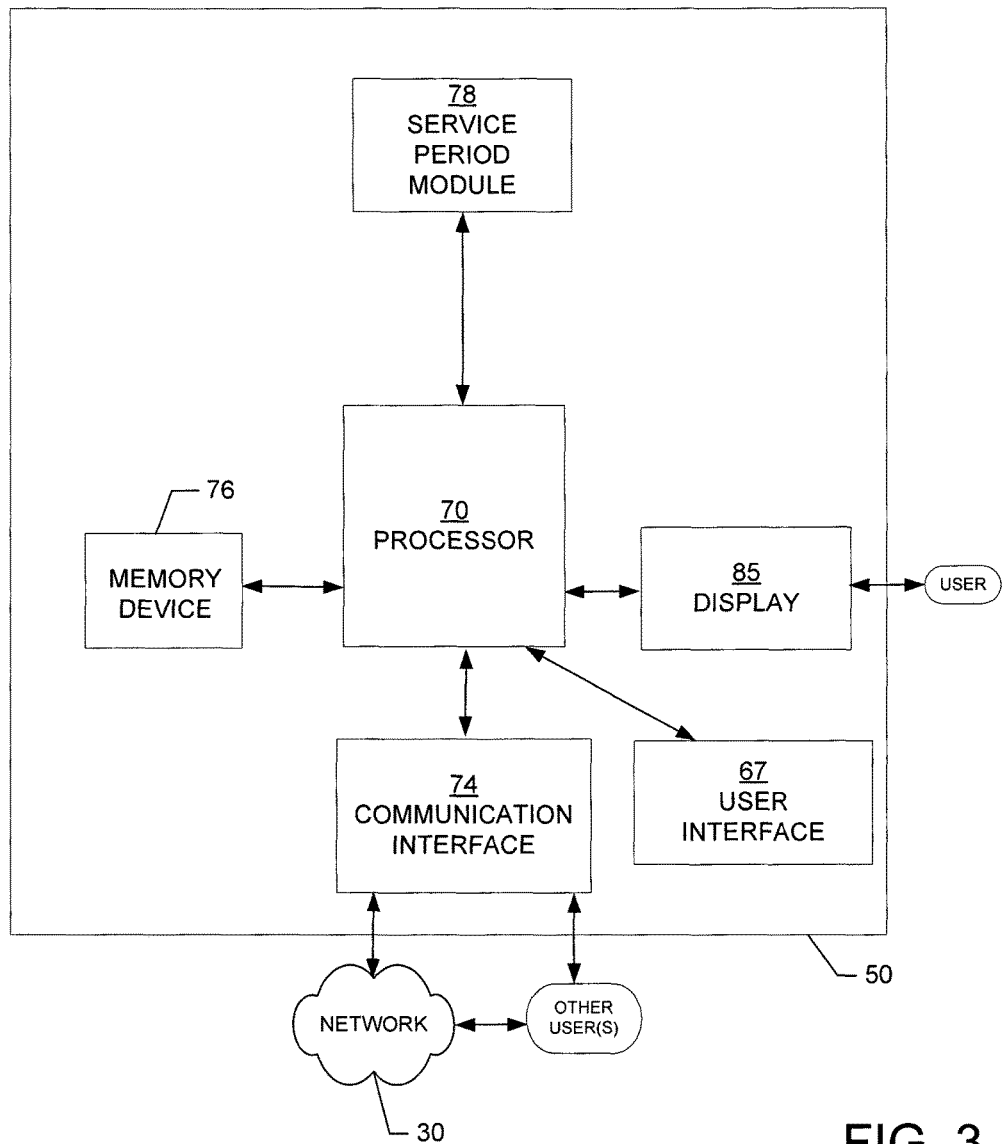
Figure 4:
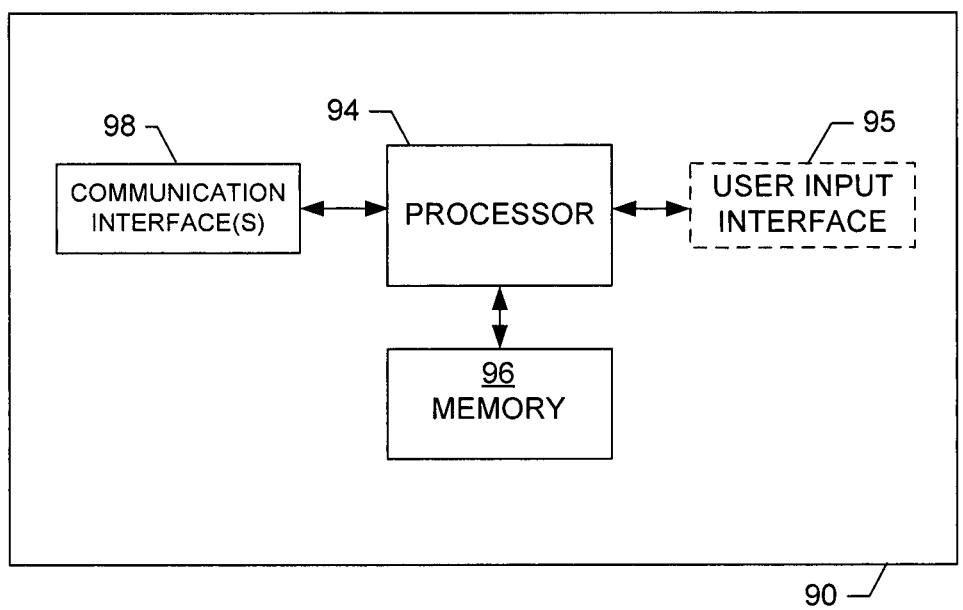
Figure 5:
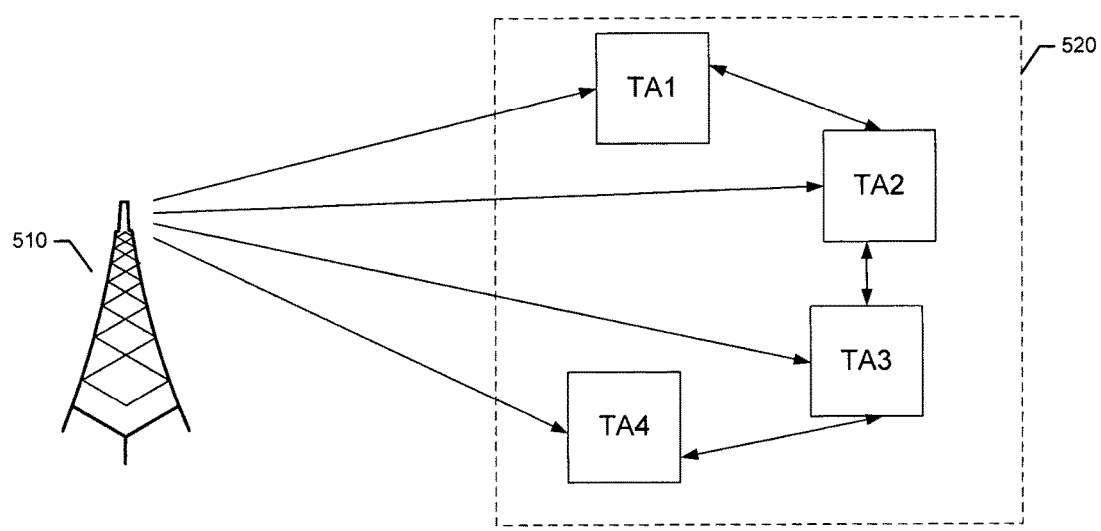
Figure 6:
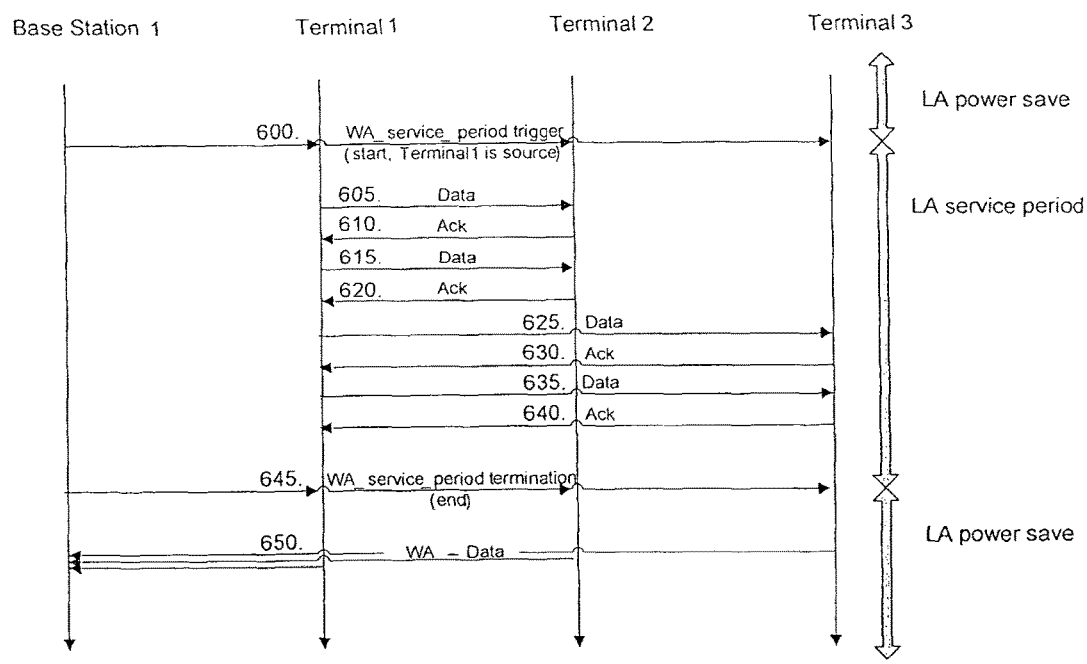
Figure 9:
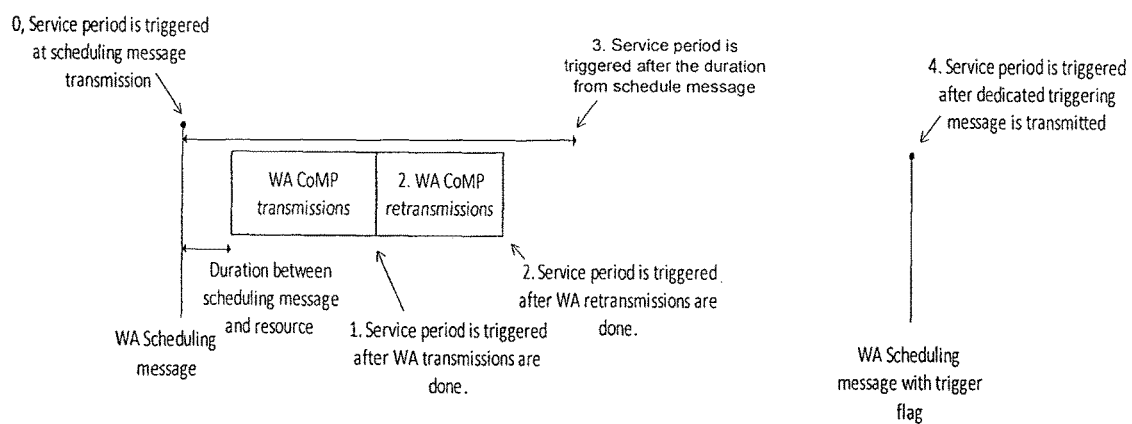
Figure 10:
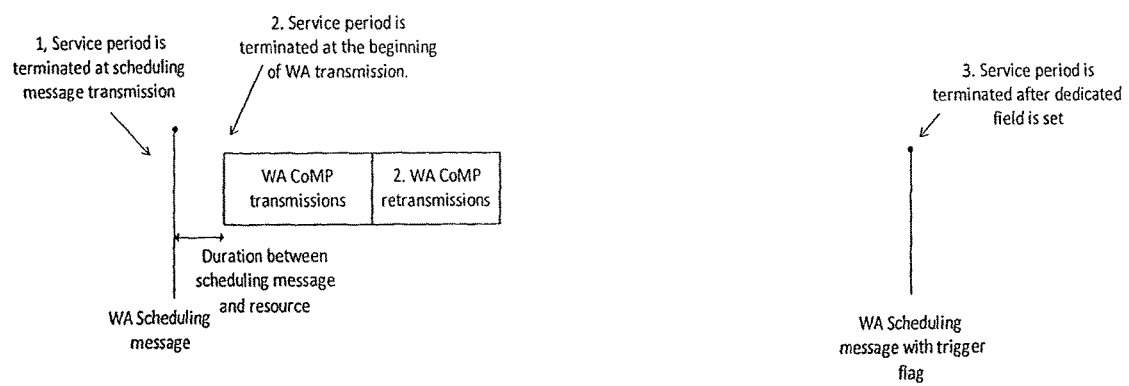
Figure 11:
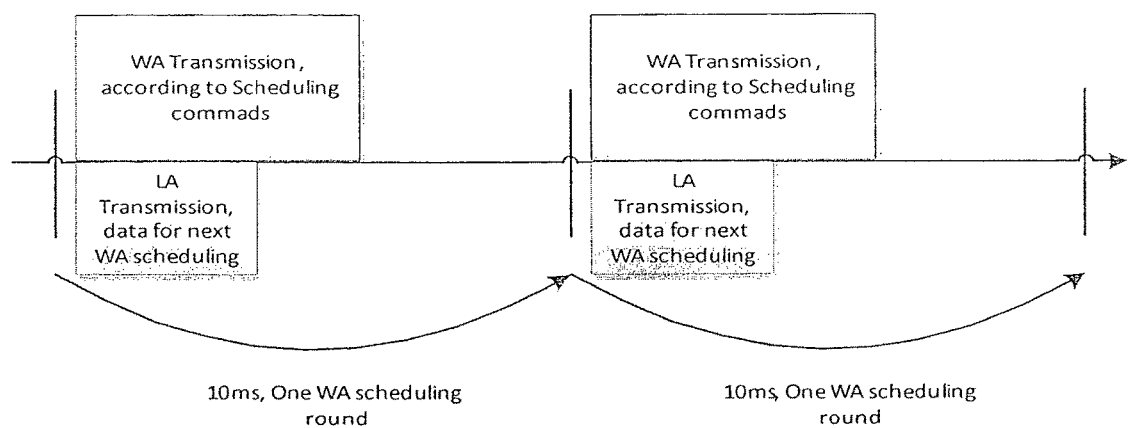
Figure 12:
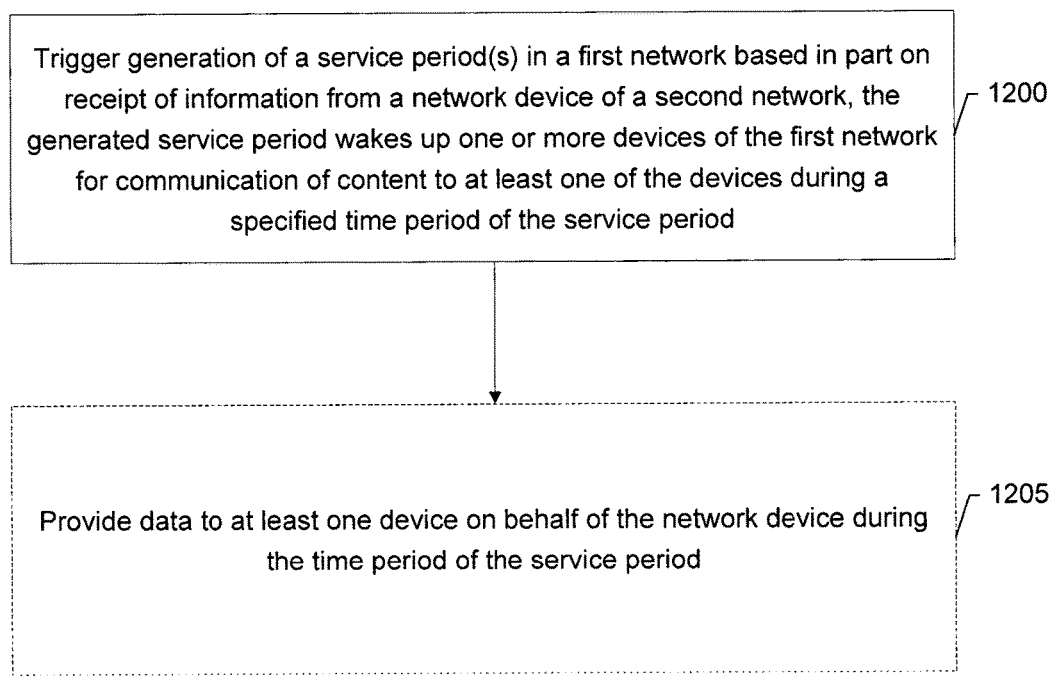
Figure 13:
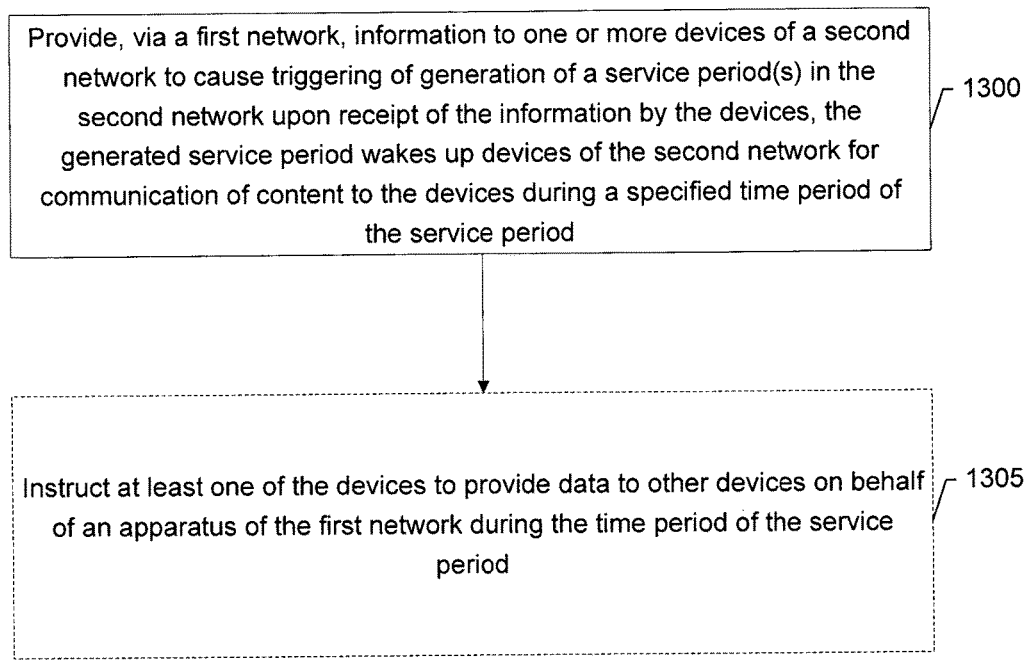

Having thus described some embodiments of the invention in general terms, reference will now be made to the accompanying drawings, which are not necessarily drawn to scale, and wherein:

FIG. 1 is a diagram illustrating a service period according to an example embodiment of the invention;

FIG. 2 is a schematic block diagram of a system according to an example embodiment of the invention;

FIG. 3 is a schematic block diagram of an apparatus according to an example embodiment of the invention;

FIG. 4 is a schematic block diagram of a network device according to an example embodiment of the invention;

FIG. 5 is a schematic block diagram of a system according to an example embodiment of the invention;

FIG. 6 is a diagram of a signal flow of a wide area network triggering generation of a service period in a local area network according to an example embodiment of the invention;

FIG. 7 is a diagram of a power save setup frame according to an example embodiment of the invention;

FIG. 8 is a diagram of a power save parameters field of a power save setup frame according to an example embodiment of the invention;

FIG. 9 is a diagram illustrating different options to trigger a service period in a local area network according to an example embodiment of the invention;

FIG. 10 is a diagram illustrating options for terminating service periods according to an example embodiment of the invention;

FIG. 11 is a diagram illustrating data flow of networks according to an example embodiment of the invention;

FIG. 12 illustrates a flowchart for triggering generation of a service period(s) in a local area network according to an example embodiment of the invention; and FIG. 13 illustrates a flowchart for triggering generation of a service period(s) in a local area network according to another example embodiment of the invention.

DETAILED DESCRIPTION

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein. Like reference numerals refer to like elements throughout. As used herein, the terms "data," "content," "information" and similar terms may be used interchangeably to refer to data capable of being transmitted, received and/or stored in accordance with embodiments of the present invention. Moreover, the term "exemplary", as used herein, is not provided to convey any qualitative assessment, but instead merely to convey an illustration of an example. Thus, use of any such terms should not be taken to limit the spirit and scope of embodiments of the invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein a "computer-readable storage medium," which refers to a non-transitory, physical or tangible storage medium (e.g., volatile or non-volatile memory device), may be differentiated from a "computer-readable transmission medium," which refers to an electromagnetic signal.

In some example embodiments, network 2 may connect devices to a data network (e.g., the Internet, etc.). In an instance in which the devices belong simultaneously to two networks such as, for example, network 1 and network 2, the network 1 may be used to distribute the received traffic from the data network (e.g., Internet) to correct recipient devices and may distribute the traffic from a single source to be transmitted to many transmitters.

The data transmission to the data network (e.g., Internet) in network 2 may be organized in many ways. In some cases, multiple-input, multiple-output (MIMO) transmission may be used and devices may transmit or receive separate spatial streams simultaneously at the same time and frequency resources. In general, these transmissions may be referred to herein as uplink (UL) cooperative multi point (COMP) transmission. Similarly, the devices may receive traffic at different spatial streams that are transmitted simultaneously at the same time and frequency resources such as, for example, downlink (DL) CoMP transmissions. The devices may transmit or receive the traffic as their own traffic and thus enabling the throughput gain from multiple transmissions. In some example embodiments, the devices may transmit the same traffic and the overall transmission power may be increased and due to increased transmission power and the amount of antennas and antenna configuration, more efficient modulation and coding scheme may be used for the transmission. Regardless of the transmission mechanism, the data that may be jointly transmitted to internet or received from internet may be referred to herein as CoMP data.

One or more end users may have a contract with a network operator. The agreement with the Internet Service Provider (ISP) may include special conditions to forward traffic of other devices to and from the Internet or capability for a device to allow other devices to help with the data forwarding to the Internet. In general, the data that is forwarded to the Internet may be considered as CoMP data. The CoMP data may also be any other type of data. For example, a special agreement may not necessarily be a requirement for CoMP data.

Some example embodiments may organize and optimally conserve power for transmissions of devices such as, for example, uplink and/or downlink cooperative multipoint (CoMP) transmissions. In this regard, the wide area (WA) networks may be optimized for transmissions with a single device and/or multiple devices. One or more multiple-input and multiple-output (MIMO) transmission schemes of the example embodiments may utilize transmissions models that may be beneficial in instances in which multiple devices are capable of transmitting and/or receiving data simultaneously.

In an example embodiment, the transmitting devices may have data to be transmitted to other transmitting devices via uplink transmissions (e.g., uplink CoMP transmissions). The transmitting devices may be synchronized and may receive the same instructions for transmission from a network device such as, for example, from a base station of a wide area network. The instruction(s) may command devices to transmit the same data at the same time, or to transmit different data at the same time or at different times. One mechanism to distribute data to transmitting devices in UL Comp transmissions of the example embodiments may involve designating a group of terminals associated with the same base station that is capable of receiving UL CoMP transmissions, and to have the terminals also be associated in/with an independent LA network to distribute the data among the transmitters of the terminals via UL CoMP transmissions. In one example embodiment, for example, a base station may operate with LTE technology and a LA network such as, for example, a wireless local area network (WLAN) may be utilized to distribute traffic among the transmitters of terminals. However, in another example embodiment, a base station may operate according to any other suitable mobile communication system and any suitable LA network may be utilized to distribute traffic among the transmitters of terminals.

An example embodiment of the invention may organize and optimize a power save mechanism for network 2 transmissions of devices. In this regard, the power save mechanism may be utilized to mitigate radio co-existence challenges. For instance, the transmissions in both a wide area network (e.g., an LTE network) and a local area network (e.g., a WLAN) may be simultaneous, since different radio technologies may be used. However, in an instance in which a device has only a single antenna or reception (RX) chain for both networks, or if the networks operate in certain frequency bands, the in-device coexistence issues may appear in the terminal. The interference of the networks may lower the achievable transmission rate or in some cases, the simultaneous transmission may not even be possible. Also, for power saving purposes and organizing other than CoMP transmissions in the networks, some scheduling mechanisms may be provided by an example embodiment.

An example embodiment an LTE network may use its discontinuous reception (DRX) and discontinuous transmission (DTX) schemes and a local area network (e.g., WLAN) may uses a specific power save topology.

Some example embodiments of the invention may optimize CoMP transmissions to achieve better power consumption. In this regard, an example embodiment may provide a power save mechanism for a local area network that may be based in part on the operation of a wide area network.

Additionally, some example embodiments may designate one or more specific conditions to trigger and terminate service periods which may denote an instance in which a device is available for a LA data transmission(s) and/or reception(s) based in part on one or more specific WA signals sent from a network device such as, for example, a base station. By designating one or more specific conditions to trigger and terminate service periods an example embodiment may optimize the power consumption of a system and may avoid unnecessary contention (e.g., time to obtain transmission opportunities (TXOPs)) and may maximize the LA radio operation of devices in a Doze (e.g., off/sleep (e.g., an inactive mode in which a transceiver is off)) state.

In another example embodiment, a device or multiple devices in a network 1 may be connected to a coexistence manager. They may or may not be connected to another wireless network (e.g., network 2). The coexistence manager may facilitate the coexistence among networks operating in the same frequencies. The coexistence manager may transmit scheduling commands or triggering signals to one or more devices in the network 1. Upon receiving the scheduling command(s) or triggering signal(s) from the coexistence manager, the service or power save period may be initiated or terminated in the network 1. In an instance in which only a device in network 1 receives the scheduling command(s) or triggering signal(s), the device may initiate the scheduling of the service or power save period in network 1. In an instance in which all devices in network 1 receive the scheduling command(s) or triggering signal(s) from the coexistence manager, the service or power save period may be started or terminated in the network 1 upon receiving the scheduling command(s) or triggering signal(s) from the coexistence manager.

The WLAN LA networks, of an example embodiment may include but are not limited to mesh or ad hoc basic service sets (BSSs) and may have their own principles for a saving power. Additionally, other LA technologies (e.g., Bluetooth) may have a mechanism to schedule service periods which may be utilized for saving power. In an example embodiment, the WLAN power save may include two main building blocks.

Some example embodiments may utilize mechanisms to deliver data among devices (e.g., devices of a local area network) in a power save mode. In this regard, to ensure that all corresponding devices are available during the data transmission a service period(s) may be utilized.

An existing service period is defined according to Institute of Electrical and Electronics Engineers (IEEE) 802.11e and an existing service period is modified in IEEE 802.11s to enable devices to operate in a power save (e.g., a Doze (e.g., off/sleep) state/mode). The example embodiments of this invention may modify the triggering rules of the service periods. In addition, IEEE 802.11z defines changes to power save management to enable service period handling in a direct link. In IEEE 802.11z, a service period may be triggered through an access point (AP) of a same basic service set (BSS). The co-existence of multiple devices is discussed in 802.11v standard. An example embodiment of the invention provides new and novel triggering rules for triggering of service periods as well as terminations of triggered service periods, as described more fully below.

A service period(s) of an example embodiment may be set between two or more devices. The service period(s) may maintain devices active for a duration of data transmission among devices. The service period(s) may be directional, for example, one device may operate as a transmitter and the other device may operate as receiver. In one example embodiment, a link may have two service periods ongoing. In this regard, for example, a first device may operate as a transmitter and a second device may operate as a receiver during one of the service periods and during another service period, the second device may operate as a transmitter and the first device may operate as a receiver.

The service periods of an example embodiment may include at least three phases. In the first phase, the service period may be triggered for allowing data transfer between devices (for example, devices of a local area). As shown in FIG. 1, a successfully transmitted data frame among devices of a local area may trigger a service period. The trigger frame may initiate one or more (e.g., two) service periods.

In the second phase, devices may transmit data and listen for data (e.g., media data), for example, available to receive transmissions from each other. Any suitable traffic data may be transmitted in a service period of an example embodiment. In the third phase, the devices may close the service period.

Referring now to FIG. 1, a service period according to an example embodiment is provided. FIG. 1 illustrates two service periods, one in which a mesh STA A is a transmitter and a mesh STA B is receiver. Additionally, FIG. 1 illustrates another service period in which mesh STA B is a transmitter and mesh STA A is a receiver. The termination of a service period(s) may stop the data transmission in a link until a new service period is triggered. This termination of a service period may allow the link to be utilized for other transmissions.

In one example embodiment, signaling between terminals in a local area network and a network device (e.g., a base station) of a WA may be provided to trigger generation of service periods. The established service period handling may allow the base station of the WA to coordinate the triggering of the service periods in the LA network. In this regard, an example embodiment may enable service period setup that enables a device(s) (e.g., a base station) in one network (e.g., a wide area network) to trigger service periods in another network (e.g., a local area network). This is typically not the case for conventional service periods in which service periods are setup in the local area. For instance, the configuration of conventional service periods typically involves signaling between an access point of a local area and a terminal of the local area to configure the service periods for a link between the devices. In this regard, the signaling for configuring the existing service periods are originated from devices inside a BSS and no external signal from an external network device is typically received to configure a service period(s). In one example embodiment, a local area network such as, for example, a WLAN and a network device(s) such as, for example, a LTE base station(s) may be utilized to organize the delivery of the data to minimize the power consumption of the power saving devices. Based in part on efficient triggering of service periods so that the devices of a local area do not have to listen at all times for data, the example embodiments may conserve the power of the devices of the local area.

The example embodiments may provide an efficient and reliable manner in which to optimize the power save for transmissions (e.g., CoMP transmissions) between devices (e.g., devices of a local area network). In an example embodiment, one or more devices transmitting data (e.g., CoMP transmissions) may receive scheduling commands from a same network device (e.g., a base station) of a WA and may utilize a LA network to facilitate sharing of the data to be transmitted.

In an example embodiment, a network device (e.g., a base station) of a WA may schedule, (e.g., command) one or more transmissions (e.g., uplink CoMP transmissions). One or more terminals of a LA may be associated with the WA base station and may receive WA transmissions. The scheduling message, sent by a network device such as, for example, a base station to the concerned terminals (e.g., terminals transmitting CoMP transmissions) may trigger the generation of service periods within the LA network, as described more fully below. Additionally, in some example embodiments, one or more service periods may be triggered between a source device which may send traffic data and the recipient devices that transmit traffic data (e.g., in UL CoMP). The service periods of an example embodiment may enable the source device and recipient devices to be available to receive and transmit traffic, as described more fully below.

The service periods of the example embodiments may be terminated by a message(s) exchanged in a LA network. In another example embodiment, a new scheduling message from a network device (e.g., a base station) of a WA may terminate the service period in a LA network, as described more fully below.

FIG. 2 illustrates a generic system diagram in which a device such as a mobile terminal 10 is shown in an exemplary communication environment. As shown in FIG. 2, an embodiment of a system in accordance with an example embodiment of the invention may include a first communication device (e.g., mobile terminal 10) and a second communication device 20 capable of communication with each other via a network 30. In one embodiment of the invention may further include one or more additional communication devices, one of which is depicted in FIG. 2 as a third communication device 25. In one embodiment, not all systems that employ an embodiment of the invention may comprise all the devices illustrated and/or described herein. While an embodiment of the mobile terminal 10 and/or second and third communication devices 20 and 25 may be illustrated and hereinafter described for purposes of example, other types of terminals, such as portable digital assistants (PDAs), pagers, mobile televisions, mobile telephones, gaming devices, laptop computers, cameras, video recorders, audio/video players, radios, global positioning system (GPS) devices, Bluetooth headsets, Universal Serial Bus (USB) devices or any combination of the aforementioned, and other types of voice and text communications systems, can readily employ an embodiment of the invention. Furthermore, devices that are not mobile, such as servers and personal computers may also readily employ an embodiment of the invention.

The network 30 may include a collection of various different nodes (of which the second and third communication devices 20 and 25 may be examples), devices or functions that may be in communication with each other via corresponding wired and/or wireless interfaces. As such, the illustration of FIG. 2 should be understood to be an example of a broad view of certain elements of the system and not an all inclusive or detailed view of the system or the network 30. Although not necessary, in one embodiment, the network 30 may be capable of supporting communication in accordance with any one or more of a number of First-Generation (1G), Second-Generation (2G), 2.5G, Third-Generation (3G), 3.5G, 3.9G, Fourth-Generation (4G) mobile communication protocols, Long Term Evolution (LTE), and/or the like. In one embodiment, the network 30 may be a point-to-point (P2P) network.

One or more communication terminals such as the mobile terminal 10 and the second and third communication devices 20 and 25 may be in communication with each other via the network 30 and each may include an antenna or antennas for transmitting signals to and for receiving signals from a base site, which could be, for example a base station that is a part of one or more cellular or mobile networks or an access point that may be coupled to a data network, such as a Local Area Network (LAN), a Metropolitan Area Network (MAN), and/or a Wide Area Network (WAN), such as the Internet. In turn, other devices such as processing elements (e.g., personal computers, server computers or the like) may be coupled to the mobile terminal 10 and the second and third communication devices 20 and 25 via the network 30. By directly or indirectly connecting the mobile terminal 10 and the second and third communication devices 20 and 25 (and/or other devices) to the network 30, the mobile terminal 10 and the second and third communication devices 20 and 25 may be enabled to communicate with the other devices or each other, for example, according to numerous communication protocols including Hypertext Transfer Protocol (HTTP) and/or the like, to thereby carry out various communication or other functions of the mobile terminal 10 and the second and third communication devices 20 and 25, respectively.

Furthermore, although not shown in FIG. 1, the mobile terminal 10 and the second and third communication devices 20 and 25 may communicate in accordance with, for example, radio frequency (RF), near field communication (NFC), Bluetooth (BT), Infrared (IR) or any of a number of different wireline or wireless communication techniques, including Local Area Network (LAN), Wireless LAN (WLAN), Worldwide Interoperability for Microwave Access (WiMAX), Wireless Fidelity (Wi-Fi), Ultra-Wide Band (UWB), Bluetooth low energy techniques and/or the like. As such, the mobile terminal 10 and the second and third communication devices 20 and 25 may be enabled to communicate with the network 30 and each other by any of numerous different access mechanisms. For example, mobile access mechanisms such as Wideband Code Division Multiple Access (W-CDMA), CDMA2000, Global System for Mobile communications (GSM), General Packet Radio Service (GPRS) and/or the like may be supported as well as wireless access mechanisms such as WLAN, WiMAX, and/or the like and fixed access mechanisms such as Digital Subscriber Line (DSL), cable modems, Ethernet and/or the like.

In an example embodiment, the first communication device (e.g., the mobile terminal 10) may be a mobile communication device such as, for example, a wireless telephone or other devices such as a personal digital assistant (PDA), mobile computing device, camera, video recorder, audio/video player, positioning device, game device, television device, radio device, or various other like devices or combinations thereof. The second communication device 20 and the third communication device 25 may be mobile or fixed communication devices. However, in one example, the second communication device 20 and the third communication device 25 may be servers, remote computers or terminals such as, for example, personal computers (PCs) or laptop computers.

In an example embodiment, the network 30 may be an ad hoc or distributed network arranged to be a smart space. Thus, devices may enter and/or leave the network 30 and the devices of the network 30 may be capable of adjusting operations based on the entrance and/or exit of other devices to account for the addition or subtraction of respective devices or nodes and their corresponding capabilities.

In an example embodiment, the mobile terminal 10 and the second communication device 20 may be part of a local area network and the third communication device 25 may be a network device (e.g., a base station) of a wide area network. In this regard, the third communication device 25 may send one or more items of data (e.g., signals) to the mobile terminal 10 and the second communication device 20 to trigger the generation of a service period(s) to enable the mobile terminal 10 and the second communication device 20 to exchange data during the service period. In another example embodiment, the third communication device 25 may send one or more messages to the mobile terminal 10 and/or the second communication device 20 to trigger termination of a service period.

As such, in one embodiment, the mobile terminal 10 may itself perform an example embodiment. In another embodiment, the second and third communication devices 20 and 25 may facilitate operation of an example embodiment at another device (e.g., the mobile terminal 10). In still one other example embodiment, the second communication device 20 and the third communication device 25 may not be included at all.

FIG. 3 illustrates a schematic block diagram of an apparatus for communicating data in an established service period(s) according to an example embodiment of the invention. An example embodiment of the invention will now be described with reference to FIG. 3, in which certain elements of an apparatus 50 are displayed. The apparatus 50 of FIG. 3 may be employed, for example, on the mobile terminal 10 (and/or the second communication device 20 or the third communication device 25). Alternatively, the apparatus 50 may be embodied on a network device of the network 30. However, the apparatus 50 may alternatively be embodied at a variety of other devices, both mobile and fixed (such as, for example, any of the devices listed above). In some cases, an embodiment may be employed on a combination of devices. Accordingly, an embodiment of the invention may be embodied wholly at a single device (e.g., the mobile terminal 10), by a plurality of devices in a distributed fashion (e.g., on one or a plurality of devices in a P2P network or in an ad hoc network) or by devices in a client/server relationship. Furthermore, it should be noted that the devices or elements described below may not be mandatory and thus some may be omitted in a certain embodiment.

Referring now to FIG. 3, the apparatus 50 may include or otherwise be in communication with a processor 70, a user interface 67, a communication interface 74, a memory device 76, a display 85, and a service period module 78. The memory device 76 may include, for example, volatile and/or non-volatile memory. For example, the memory device 76 may be an electronic storage device (e.g., a computer readable storage medium) comprising gates configured to store data (e.g., bits) that may be retrievable by a machine (e.g., a computing device like processor 70). In an example embodiment, the memory device 76 may be a tangible memory device that is not transitory. The memory device 76 may be configured to store information, data, files, applications, instructions or the like for enabling the apparatus to carry out various functions in accordance with an example embodiment of the invention. For example, the memory device 76 could be configured to buffer input data for processing by the processor 70. Additionally or alternatively, the memory device 76 could be configured to store instructions for execution by the processor 70. As yet another alternative, the memory device 76 may be one of a plurality of databases that store information and/or media content (e.g., pictures, videos, etc.). The memory device 76 may store data received from other apparatuses 50 and/or network devices (e.g., base stations).

The processor 70 may be embodied in a number of different ways. For example, the processor 70 may be embodied as one or more of various processing means such as a coprocessor, microprocessor, a controller, a digital signal processor (DSP), processing circuitry with or without an accompanying DSP, or various other processing devices including integrated circuits such as, for example, an ASIC (application specific integrated circuit), an FPGA (field programmable gate array), a microcontroller unit (MCU), a hardware accelerator, a special-purpose computer chip, or the like. In an example embodiment, the processor 70 may be configured to execute instructions stored in the memory device 76 or otherwise accessible to the processor 70. As such, whether configured by hardware or software methods, or by a combination thereof, the processor 70 may represent an entity (e.g., physically embodied in circuitry) capable of performing operations according to an embodiment of the invention while configured accordingly. Thus, for example, when the processor 70 is embodied as an ASIC, FPGA or the like, the processor 70 may be specifically configured hardware for conducting the operations described herein. Alternatively, as another example, when the processor 70 is embodied as an executor of software instructions, the instructions may specifically configure the processor 70 to perform the algorithms and operations described herein when the instructions are executed. However, in some cases, the processor 70 may be a processor of a specific device (e.g., a mobile terminal or network device) adapted for employing an embodiment of the invention by further configuration of the processor 70 by instructions for performing the algorithms and operations described herein. The processor 70 may include, among other things, a clock, an arithmetic logic unit (ALU) and logic gates configured to support operation of the processor 70.

In an example embodiment, the processor 70 may be configured to operate a connectivity program, such as a browser, Web browser or the like. In this regard, the connectivity program may enable the apparatus 50 to transmit and receive Web content, such as for example location-based content or any other suitable content, according to a Wireless Application Protocol (WAP), for example. It should be pointed out that the processor 70 may also be in communication with a display 85 and may instruct the display to illustrate any suitable information, data, content (e.g., media content) or the like.

Meanwhile, the communication interface 74 may be any means such as a device or circuitry embodied in either hardware, a computer program product, or a combination of hardware and software that is configured to receive and/or transmit data from/to a network and/or any other device or module in communication with the apparatus 50. In this regard, the communication interface 74 may include, for example, an antenna (or multiple antennas) and supporting hardware and/or software for enabling communications with a wireless communication network (e.g., network 30). In fixed environments, the communication interface 74 may alternatively or also support wired communication. As such, the communication interface 74 may include a communication modem and/or other hardware/software for supporting communication via cable, digital subscriber line (DSL), universal serial bus (USB), Ethernet or other mechanisms.

The user interface 67 may be in communication with the processor 70 to receive an indication of a user input at the user interface 67 and/or to provide an audible, visual, mechanical or other output to the user. As such, the user interface 67 may include, for example, a keyboard, a mouse, a joystick, a display, a touch screen, a microphone, a speaker, or other input/output mechanisms. In an example embodiment in which the apparatus is embodied as a server or some other network devices, the user interface 67 may be limited, remotely located, or eliminated. The processor 70 may comprise user interface circuitry configured to control at least some functions of one or more elements of the user interface, such as, for example, a speaker, ringer, microphone, display, and/or the like. The processor 70 and/or user interface circuitry comprising the processor 70 may be configured to control one or more functions of one or more elements of the user interface through computer program instructions (e.g., software and/or firmware) stored on a memory accessible to the processor 70 (e.g., memory device 76, and/or the like).

In an example embodiment, the processor 70 may be embodied as, include or otherwise control a service period module 78. As such, in one embodiment, the processor 70 may be said to cause, direct or control the execution or occurrence of the various functions attributed to the service period module 78, as described herein. The service period module 78 may be any means such as a device or circuitry operating in accordance with software or otherwise embodied in hardware or a combination of hardware and software (e.g., processor 70 operating under software control, the processor 70 embodied as an ASIC or FPGA specifically configured to perform the operations described herein, or a combination thereof) thereby configuring the device or circuitry to perform the corresponding functions of the service period module, as described herein. Thus, in examples in which software is employed, a device or circuitry (e.g., the processor 70 in one example) executing the software forms the structure associated with such means.

In an example embodiment, the service period module 78 may be configured to receive items of data (e.g., signals, a message(s), etc.) from a network device (e.g., a base station) of a wide area network (e.g., a cellular communications network). Alternatively, the service period module 78 may be configured to receive items of data from a coexistence manager, which facilitates the coexistence among networks operating in the same frequencies. The data received by the service period module 78 from the network device or a coexistence manager may trigger the service period module 78 to generate a service period in a local area network (e.g., a WLAN, etc.) to enable the apparatus 50 to transmit and/or exchange data with other apparatuses 50 of the local area network. In this regard, the apparatus 50 may be source device to provide data received from the network device to other apparatuses 50 of the local area network. This may allow the network device to offload traffic to the apparatus 50 and enable the service period module 78 to provide the data to other apparatuses 50 of the local area network. In this manner, the apparatuses 50 of the local area network may conserve energy/power since the network device or coexistence manager may provide information to the service period module 78 to trigger the generation of a service period which may wake up the apparatuses 50 for receipt of data. As such, the apparatuses 50 do not necessarily need to remain active to listen for data to receive.

Additionally, the service period module 78 may receive one or more items of data (e.g., signals, messages) from the network device or coexistence manager to denote to the service period module 78 to terminate an active service period established with another apparatus(es) 50 of the local area network. In this regard, the service period module 78 may terminate the service period in response to receipt of the data from the network device or coexistence manager. In another example embodiment, the service period module 78 may terminate an established service period upon complete of transfer of data to one or more other apparatuses 50.

Referring now to FIG. 4, a block diagram of an example embodiment of a network device is provided. As shown in FIG. 4, the network device 90 (also referred to herein as a serving network apparatus 90) (e.g., a base station or coexistence manager) may include a processor 94, an associated memory 96, a communication interface(s) 98 and an optional user input interface 95.

In some example embodiments, one or more of the means illustrated in FIG. 4 may be embodied as a chip or chip set. In other words, the network device 90 may comprise one or more physical packages (for example, chips) including materials, components and/or wires on a structural assembly (for example, a baseboard). The structural assembly may provide physical strength, conservation of size, and/or limitation of electrical interaction for component circuitry included thereon. In this regard, the processor 94, memory 96, communication interface(s) 98 may be embodied as a chip or chip set. The network device 90 may therefore, in some example embodiments, be configured to implement embodiments of the present invention on a single chip or as a single "system on a chip." As another example, in some example embodiments, the network device 90 may comprise component(s) configured to implement embodiments of the present invention on a single chip or as a single "system on a chip." As such, in some cases, a chip or chipset may constitute means for performing one or more operations for providing the functionalities described herein.

The memory 96 may comprise volatile and/or non-volatile memory, and may store content, data and/or the like. The memory 96 may store client applications, instructions, and/or the like for the processor 94 to perform the various operations of the network device 90. Additionally, the memory 96 may comprise a non-transitory computer-readable storage medium. Although illustrated in FIG. 4 as a single memory, the memory 96 may comprise a plurality of memories. The plurality of memories may be embodied on a single computing device or may be distributed across a plurality of computing devices collectively configured to function as the network device 90. In various example embodiments, the memory 96 may comprise a hard disk, random access memory, cache memory, flash memory, a compact disc read only memory (CD-ROM), digital versatile disc read only memory (DVD-ROM), an optical disc, circuitry configured to store information, or some combination thereof. The memory 96 may be configured to store information, data, applications, instructions, or the like for enabling the network device 90 to carry out various functions in accordance with various example embodiments. For example, in some example embodiments, the memory 96 is configured to buffer input data for processing by the processor 94. Additionally or alternatively, the memory 96 may be configured to store program instructions for execution by the processor 94. The memory 96 may store information in the form of static and/or dynamic information. This stored information may be stored and/or used by the processor 94 during the course of performing its functionalities.

The processor 94 may also be connected to at least one communication interface 98 or other means for displaying, transmitting and/or receiving data, content, and/or the like. The optional user input interface 95 may comprise any of a number of devices allowing the network device 90 to receive data from a user, such as a keypad, a touch display, a joystick or other input device. In this regard, the processor 94 may comprise user interface circuitry configured to control at least some functions of one or more elements of the user input interface. The processor and/or user interface circuitry of the processor may be configured to control one or more functions of one or more elements of the user interface through computer program instructions (e.g., software and/or firmware) stored on a memory accessible to the processor (e.g., volatile memory, non-volatile memory, and/or the like).

Additionally, as such, whether configured by hardware or software methods, or by a combination thereof, the processor 94 may comprise an entity capable of performing operations according to embodiments of the present invention while configured accordingly. Thus, for example, when the processor 94 is embodied as an ASIC, FPGA or the like, the processor 94 may comprise specifically configured hardware for conducting one or more operations described herein. Alternatively, as another example, when the processor 94 is embodied as an executor of instructions, such as may be stored in the memory 96, the instructions may specifically configure the processor 94 to perform one or more algorithms and operations described herein.

The processor 94 of the network device 90 may send data (e.g., signals, a message(s), etc.) to an apparatus (e.g., apparatus 50) to trigger the apparatus to generate a service period to enable the apparatus to exchange data with other apparatuses (e.g., other apparatuses 50) of a local area network. In one example embodiment, the processor 94 of the network device 90 may provide data to the apparatus (e.g., apparatus 50) and may instruct the apparatus to provide the data to other apparatuses of the local area network. Additionally, the processor 94 of the network device 90 may send data to the apparatus (e.g., apparatus 50) denoting to the apparatus to terminate an active/established service period.

Referring now to FIG. 5, a diagram illustrating a system according to an example embodiment is provided. The system of FIG. 5 may include a serving network apparatus, such as for example, base station 510 (e.g., network device 90), of a wide area network (WAN) and several terminal apparatuses, labeled TA1 through TA4 (e.g., apparatuses 50). FIG. 5 illustrates several terminal apparatuses, namely TA1 through TA4 that are part of an ad hoc local area network (LAN) 520. The terminal apparatuses TA1 through TA4 may receive data (e.g., a signal(s), a message(s), etc.) from a processor (e.g., processor 94) of the base station 510. The data received from the base station 510 may trigger a service period module (e.g., service period module 78) of the terminal apparatuses TA1, TA2, TA3 and TA4 to generate/start a service period(s) to enable communications of data between the terminal apparatuses TA1, TA2, TA3 and TA4.

In this regard, in response to the terminal apparatuses TA1, TA2, TA3, TA4 setting up/establishing the service period(s), a source terminal apparatus (e.g., terminal apparatus TA1) may provide data (e.g., CoMP data) to one or more of the terminal apparatuses TA2, TA3 and/or TA4 of the LAN 520. The data provided by the source terminal apparatus (e.g., terminal apparatus TA1) to the terminal apparatuses TA2, TA3, TA4 in cooperative communication with the source terminal apparatus may be received from the base station 510 to offload traffic from the base station 510 to the source terminal apparatus.

Additionally, the processor (e.g., processor 94) of the base station 510 may send data (e.g., a signal(s), a message(s), etc.) to the terminal apparatuses TA1, TA2, TA3, and TA4 to terminate the service period(s). In response to receipt of this data, the service period module (e.g., service period module 78) of the terminal apparatuses TA1, TA2, TA3, TA4 may terminate the service period(s). In another example embodiment, the terminal apparatuses TA1, TA2, TA3, TA4 may terminate the service period(s) upon completion of transfer of data. For example, a source terminal (e.g., terminal apparatus TA1) may indicate with the data packets that it has transmitted all data frames and receivers (e.g., terminals 2, 3) may acknowledge that they have received this information. In this regard, in an instance in which the terminal has completed the transfer, the service period may end. Alternatively, in another example embodiment, one or more service periods between terminals may be terminated in an instance in which local area data transfer is completed. In another alternative example embodiment, service periods between terminals may be terminated in an instance in which transfer from a base station has completed.

Referring now to FIG. 6, a diagram illustrating a signal flow of a network device of a wide area network triggering a service period among devices of a local area network according to an example embodiment is provided. In the example embodiment of FIG. 6, the terminals 1, 2, and 3 (e.g., terminal apparatuses TA1, TA2, TA3, respectively) may be connected to a base station 1 (e.g., base station 510) of a wide area network. The terminals 1, 2, 3 may form or be part of a group (e.g., a CoMP group) and may be connected to a local area network (e.g., local area network 520). In the example embodiment of FIG. 6, the base station 1 may be aware of the local area network as well as the terminals (e.g., terminals 1, 2, 3) of the local area network.

At operation 600, the base station 1 may provide a message (e.g., a WA message, a WA signal) to the terminals 1, 2, and 3. The message may include information requesting the terminals to trigger generation of a service period to enable the terminals to communicate data between each other. As such, receipt of the message may wake up the terminals 1, 2, 3 from a local area power save mode (e.g., a Doze (off/sleep) state)). The information of the message provided from the base station 1 to the terminals 1, 2, 3 may specify that terminal 1 is a source terminal for providing data to the other terminals 2 and 3. At operation 605, terminal 1 may provide a first set of data (e.g., CoMP data) to terminal 2 during the triggered service period of the local area network. The first set of data may be data provided by the base station 1 to the terminal 1 for transmitting to the other terminals 2, 3 to enable the base station to offload some traffic to the terminal 1. The first set of data that the base station 1 may send to the terminal 1 for providing to the other terminals 2, 3 may be in the message requesting triggering of the service period or this first set of data may be sent by the base station 1 to the terminal 1 in another message. It should be pointed out that the data transmission in FIG. 6 is an example for purposes of illustration and not of limitation. As such, there may be more/other data transmitted and the transmitted data need not relate to the CoMP transmission. In this regard, for example, any data may be transmitted between the devices. Also, alternatively the entity transmitting the service period triggers may be a coexistence manager.

At operation 610, the terminal 2 may send an acknowledgement (Ack) message to terminal 1 indicating that terminal 2 received the first set of data (e.g., CoMP data, etc.). At operation 615, terminal 1 may provide additional data (e.g., a second set of CoMP data) to terminal 2 during the triggered service period of the local area network. The additional data may also be data provided by the base station 1 to the terminal 1 for transmitting to the other terminals 2, 3. At operation 620, the terminal 2 may send another acknowledgement message to terminal 1 indicating that terminal 2 received the additional data (e.g., a second set of CoMP data, etc.).

At operation 625, the terminal 1 (e.g., a source terminal) may provide the first set of data received from the base station 1 to the terminal 3 during the triggered service period of the local area network. At operation 630, the terminal 3 may send an acknowledgement message to the terminal 1 indicating receipt of the first set of data.

At operation 635, terminal 1 may provide additional data (e.g., the second set of CoMP data) to terminal 3 during the triggered service period of the local area network. As described above, the additional data may also be data provided by the base station 1 to the terminal 1 for transmitting to the other terminals 2, 3. At operation 640, the terminal 3 may send another acknowledgement message to terminal 1 indicating that terminal 3 received the additional data (e.g., a second set of CoMP data, etc.). At operation 645, the base station 1 may send a message (e.g., a WA signal(s), a WA message, etc.) to the terminals 1, 2, 3 instructing the terminals to terminate the generated service period. In an alternative example embodiment, in an instance in which there may be terminals (e.g., terminals 2, 3) that did not receive any transmission, the service periods of these terminals may be terminated as well. In response to receipt of the message from the base station 1, the terminals 1, 2, 3 may terminate/close the service period. At operation 650, the terminals 1, 2, 3 may send the base station an uplink message indicating that the data (e.g., the first set of data and the additional data) provided to the terminal 1 by the base station 1 for transmissions to the terminals 2, 3 was received. As such, the terminals 1, 2, 3 may indicate that the data is being transmitted or that the data will be transmitted in the future according to a defined scheduling mechanism generated by the base station 1. In one example embodiment, the data being transmitted may be an uplink or downlink stream of data to be forwarded or any other suitable data. The local area network and wide area network may coordinate with each relating to which terminals may transmit the data.

In an alternative example embodiment, during operation 620, the terminal 1 may close/terminate a service period between the terminal 1 and terminal 2 since the data received by the base station 1 for transfer to terminal 2 is properly received. In this regard, terminal 1 may indicate to terminal 2 that the final set of data is transmitted and that the service period between terminal 1 and terminal 2 is being closed. Similarly, in an alternative example embodiment, during operation 640, the terminal 1 may close/terminate a service period between the terminal 1 and terminal 3 since the data received by the base station 1 for transfer to terminal 3 is properly received. In this manner, terminal 1 may indicate to terminal 3 that the final set of data was transmitted and that the service period between terminal 1 and terminal 3 is being closed.

In an instance in which there are multiple transmitters in uplink transmission group (e.g., an uplink CoMP transmission group), the device that is the source (e.g., terminal 1) of the data may use individually addressed frames to setup separate triggering criterion for each device (e.g., terminal 2, terminal 3). The multiple triggering criteria may help to organize transmission times for each device (e.g., terminal 2, terminal 3) and to reduce power consumption through reduced contention. In the timing of the service periods, the devices may also consider other transmissions (e.g., CoMP transmissions) from other devices in the area. One approach that the source device may utilize is to combine the activity of all related data transmissions (e.g., CoMP related data transmissions) to the same time to maximize the sleep time of the devices of the uplink transmission group and avoid multiple wake-up operations.

In an instance in which a source device may determine that a device is not capable to operate in local area according to a power save (e.g., a CoMP power save), the source device may use the local area network specific power save mechanism that does not use triggering or termination of the service periods from WA signals with the device. In some cases, the LA network may have different power save mechanisms in use. Some devices may use WA assisted power save and some devices may use a LA specific power save mechanism.

In another example embodiment, in which the base station (e.g., base station 510) of the wide area (also referred to herein as wide area network) coordinates the power save the base station may signal the setup for a power save (e.g., CoMP power save) and the base station may define the timing for a service period(s) of the local area to be optimized for wide area transmissions. However, it should be noted that the base station may not necessarily have real time information and precise knowledge of the local area network. In this regard, the base station may command service periods regularly for local area network, and may assign terminals to be sources based on their activity (e.g., the type of the data/data stream the terminal is transmitting). In this regard, a corresponding terminal (e.g., terminal 1) may indicate the need for service periods, changes in the service period need, or also an immediate need of a service period to the base station. The need for service periods may depend on the data/data stream, maximum delay of the transmitted traffic, the characteristics of the local area network, congestion in local area network channels or any other suitable information. In an instance in which the local area network is congested, the devices of the uplink transmission group may operate in an active mode for the local area network. Data transmissions may be provided to corresponding devices in active mode at any time, for example, no service periods may be needed.

In one alternative example embodiment, a source terminal (e.g., terminal 1) of uplink traffic (e.g., uplink CoMP traffic) may utilize one or more group addressed frame transmissions to deliver the traffic for uplink transmissions (e.g., uplink CoMP transmissions) to terminals of the group (e.g., terminal 2, terminal 3). In this instance, a service period(s) may not be triggered between the source terminal and the receiving devices of the group, but after triggering group addressed frames for transmission, the last transmitted group addressed frame may include an indication that no more Physical Layer Converge Protocol (PLCP) Payload Data Units (PPDUs) may be transmitted to the receiving devices of the group and the receiving devices may return to a Doze/radio off state.

The messages to trigger the service period and potentially to end the service period generated by a base station (e.g., base station 510) do not necessarily need specific parameters if the service period is configured in a local area network. The trigger from the base station of the wide area may not even necessarily be a specific message. For example, the end of data transmissions (e.g., CoMP data transmissions) to a base station of a wide area may automatically trigger the generation of the service period.

The source terminal (e.g., terminal 1) may establish a local area power save to reduce the power consumption in a local area network for transmitting traffic (e.g., CoMP traffic) data to one or more receiving devices (e.g., terminals 2, 3) of the local area network. In this regard, devices of the local area network may signal their capabilities to use a power save mechanism (e.g., a CoMP power save mechanism) to the source terminal in an instance in which the devices establish a local area network. In this manner, the source terminal may transmit a power save setup message (e.g., a CoMP Power Save Setup message) to assign one or more power save parameters for other transmitters of the receiving devices. The source terminal may transmit the power save setup message (e.g., a CoMP power save setup message) to an individual address to enable an individual receiving device (e.g., terminal 2) of a group of receiving devices of a local area network to perform power saving mechanisms. Alternatively, the source terminal may transmit the power save setup message to a group of addresses of the receiving devices of the local area network to enable the receiving devices (e.g., terminals 2, 3) to perform power saving mechanisms. The power save setup message (e.g., a CoMP power save setup message) provided to group addresses by the source terminal may provide the same power save parameters for each of the receiving devices.

Referring now to FIG. 7, a diagram illustrating a power setup frame according to an example embodiment is provided. The power save setup frame 2 may be generated by a base station (e.g., base station 510) of a wide area (also referred to herein as wide area network). The base station may send the power save setup frame to one or more devices (e.g., terminal apparatuses TA1, TA2, TA3, TA4) of a local area network (e.g., LAN 520). In an example embodiment, the power setup frame may, but need not, be a CoMP power save setup frame. The power save parameters field 3 of the power setup frame may include one or more parameters that specify the triggering and the terminal criteria for service periods. In another example embodiment, the frame 2 may be generated by a coexistence manager. In another example embodiment, the frame 2 may be generated by a source device (e.g., terminal apparatus TA1) in network 1 (e.g., LAN 520). In this example embodiment, the source device may use this frame (e.g., frame 2) to set service period triggering rules which may depend on transmissions (e.g., frame, bit, end/start of transmissions) from a base station or coexistence manager.

The delay from schedule message field 5 may indicate the duration in units of 32 microseconds from the local area service period triggering and the start time service period. As one example, the delay may be used to schedule service periods in a local area network to occur at different times or to set the local area service periods to occur at the times in an instance in which a base station (e.g., base station 510) of a wide area network is not transmitting. In this instance, a source terminal (e.g., terminal 1) may estimate the transmission time of the base station of the wide area transmissions and may set the local area transmission to occur after the transmission of the base station of the wide area.

The awake window 7 may indicate the duration of the awake window in units of 32 microseconds. In an instance in which the power save parameters field 3 indicates that the awake window is not used, the field 7 may be reserved. The device is awake during its awake window and may receive trigger frames from a LA network. If no trigger frame is received, the terminal may return to the Doze state.

Referring now to FIG. 8, a diagram illustrating a power save parameters field of a power save setup frame is provided according to an example embodiment. The power save parameters field 9 (e.g., power save parameters field 3) may include a service period triggering condition field 11, a triggering mode field 12, a dedicated trigger field 14, a trigger condition repetition field 15, a service period termination condition field 17 and a termination condition repetition field 19. In an example embodiment, a processor (e.g., processor 94) of a base station (e.g., base station 510) may configure the fields 11, 12, 14, 15, 17, and 19 of the power save parameters field 9. Additionally, the power save parameters field 9 may be provided by the base station to one or more devices of a local area network (e.g., LAN 520) in a power save setup frame (e.g., power save setup frame 2). The power save setup frame including the fields (e.g. field 9) may also be sent by a source node in network 1 (e.g., a LAN (e.g., LAN 520)), or a coexistence manager, as described above.

The service period triggering condition field 11 may set the criteria to trigger a service period(s) among devices of a local area network. In one example embodiment, the service period triggering condition field 11 may be set to 0, to indicate to one or more devices of a local area network that a service period(s) is triggered based in part on transmission of a scheduling message from a base station (e.g., base station 510) of a wide area network which is received by one or more devices of the local area network. The service period triggering condition field 11 may be set to 1 to indicate to one or more devices of a local area network that a service period(s) is triggered after data transmission of the one or more devices of the local area network to a base station of a wide area is completed. The service period triggering condition field 11 may be set to 2 to indicate that a service period(s) is triggered by one or more devices of a local area network after retransmissions of data to a base station of a wide area are performed.

Referring now to FIG. 9, a diagram is provided illustrating service period triggering options according to an example embodiment. At operation 0, a service period(s) may be triggered by one or more devices (e.g., terminal apparatuses TA1, TA2, TA3, TA4) of a local area network (e.g., LAN 520) upon receipt of a message such as, for example, a scheduling message (also referred to herein as a wide area scheduling message) that is transmitted by a base station (e.g., base station 510) of a wide area network. In one example embodiment, the devices of the local area network may trigger generation of a service period(s) upon receipt of the scheduling message in an instance in which the service period triggering condition field 9 of the power save parameters field is set to 0. At operation 1, one or more devices of a local area network may trigger generation of a service period(s) after the wide area (WA) data transmissions (e.g., WA CoMP transmissions) from the devices of the local area network to a base station (e.g., base station 510) are complete. In an example embodiment, the devices of the local area network may trigger the generation of a service period after WA data transmissions in an instance in which the service period triggering condition field 11 of a power save parameters field 9 is set to 1.

At operation 2, in an instance in which all or a portion of the WA data transmissions failed, one or more devices of the local area network may trigger generation of a service period(s) after the WA data is retransmitted (e.g., WA CoMP retransmissions) to the base station (e.g., base station 510). In an example embodiment, the devices of the local area network may trigger generation of the service period after WA data is retransmitted in an instance in which the service period triggering condition field 9 of the power save parameters field 11 is set to 2.

At operation 3, one or more devices of a local area network may trigger generation of a service period(s) after a specified duration of a schedule message for transmitting the WA data. For instance, the duration may be an estimate of the amount of time it may take for the one or more devices of the local area network to transmit the WA data to the base station. In this regard, upon expiration of the estimated time (also referred to herein as estimated time period), the devices of the local area network may trigger generation of a service period(s). At operation 4, one or more devices of a local area network may trigger generation of a service period(s) to exchange data among the devices based in part of a detection of a trigger flag in a scheduling message (e.g., a dedicated triggering message) received from the base station of the wide area.

Referring back to FIG. 8, the service period triggering mode field 12 may indicate a type of service period to be triggered. In one example embodiment, the service period triggering mode field 12 may be set to 0 to indicate that the actual service period is not triggered, but may indicate that the service period initiation time is an awake window in which a duration is specified in an awake window duration field of a local area power save setup message (e.g., power save setup frame 2 (e.g., CoMP power save setup message)). During the awake window, the devices of a local area network may send a data Media Access Control (MAC) Protocol Data Unit (MPDU) to each other to trigger generation of a service period(s).

The service period triggering mode field 12 may be set to 1 to indicate that a service period is initiated to enable data transmissions (e.g., uplink CoMP data) toward a source terminal (e.g., terminal apparatus TA1 (e.g., terminal 1)). The source terminal for distributing the data transmissions to receiving devices of the local area network may establish the power save between the devices of a local area network. The source of data may be available to the source terminal until the source terminal receives a frame, from a base station, with a set End of Service Period (EoSP) bit to terminate the service period(s). In one example embodiment, a service period(s) may be used by devices of a local area network to transmit downlink data among the devices or to transmit uplink data (e.g., uplink CoMP data) among the devices.

The service period triggering mode field 12 may be set to 2 to indicate that a service period(s) is initiated that enables the source terminal of the data to transmit the data toward one or more corresponding receiving devices (e.g., a CoMP device(s)). The service period triggering mode field 12 may be set to 3 to indicate that two service periods are initiated. Alternatively, in an instance in which the devices of the local area network are capable of using bi-directional service periods, a bi-directional service period(s) may be initiated by the devices of the local area network in an instance in which the service period triggering mode field 12 is set to 4.

The dedicated trigger field 14 may be set to 0 to indicate that a service period(s) is initiated when the condition occurs. The dedicated trigger field 14 is set to 1 to indicate that a condition occurs if the WA scheduling message which has the specific trigger bit set to 1. If the trigger bit is not set, the condition is ignored.

The WA trigger condition repetition field 15 may indicate the number of repeated WA conditions required to trigger the generation of a service period(s). In one example embodiment, in an instance in which the trigger condition repetition field 15 is set to a value 0, the trigger condition repetition field 15 may be reserved. In an instance in which the trigger condition repetition field 15 is set to 1, every designated condition may trigger a service period. The WA triggering condition is defined by fields 11 and 14, for example, when the service period is triggered and may be a specific field set when a service period is triggered. In one example embodiment, an indication of a trigger condition repetition field 15 set to 2 may denote that every second condition triggers a service period(s). In one example embodiment, the trigger condition repetition field 15 may be utilized in an instance in which a base station (e.g., base station 510) of a wide area does not use dedicated trigger fields (e.g., dedicated trigger field 14). For instance, it may be the case that the wide area is a bottleneck of the throughput and that the local area is more efficient to deliver new traffic for transmission such that it is enough to use only every second trigger interval for triggering a service period for delivery of data among devices of a local area network.

The service period termination condition field 17 may be set to 0 to indicate that no extra termination condition from a base station of a wide area is set. In this regard, for example, a service period may be terminated based in part on the messages exchanged between devices of a local area network. For instance, in this manner, a service period may be terminated in an instance in which devices of the local area network complete the transmission of data among each other. In one example embodiment, an indication of the service period termination field set to 1 may denote that a scheduling message sent from a base station (e.g., base station 510) of a wide area network sent to one or more devices (e.g., terminal apparatuses TA1, TA2, TA3, TA4) of a local area network (e.g., LAN 520) may terminate a service period(s). In another example embodiment, an indication that the service period termination condition field 17 is set to 2 may denote that the beginning of transmission of WA data (e.g., CoMP WA data) to the base station of the wide area network by one or more devices of a local area network may terminate the local area service period. In another example embodiment, an indication that the service period termination condition field 17 is set to 3 may denote that a specific bit in a scheduling message provided to one or more devices of a local area network from a base station (e.g., base station 510) may terminate a service period(s). The termination condition repetition field 19 may include data indicating that every Xth wide area termination condition terminates a service period.

Referring now to FIG. 10, a diagram illustrating options for service period terminations according to an example embodiment is provided. In the example embodiment of FIG. 10, a local area service period may control device availability in a local area network (e.g., LAN 520). The transmissions and receptions of data to/from a wide area (e.g., a base station of a WA) may not be affected by the local area service period handling. For instance, WA transmissions may follow a WA power save scheme that may include discontinuous reception (DRX) and discontinuous transmission (DTX) periods. As such, ongoing/active service periods in the local area network may not affect WA transmissions from devices of a local area network sending data to a base station of a wide area.

In one example embodiment, the service period termination condition field 17 may be set to 0 to indicate that no termination condition from the wide area network is set. For instance, the local area service period(s) may be terminated by the messages exchanged in the local area. In this regard, in one example embodiment, the service period termination message exchanged in the local area (e.g., LAN 520) may be a successful transmission of a MPDU with End of Service Period (EoSP) field of a MAC header set to 1.

At operation 1, the service period termination condition field 15 may be set to 1 to indicate that the local area service period(s) may be terminated by messages exchanged between the devices of the local area or reception of a scheduling message (e.g., a WA scheduling message) from a base station of a wide area, whichever occurs earlier. It should be pointed out that in an instance in which a same WA scheduling message is configured to trigger a service period, a service period may be ongoing even after a scheduling message (e.g., a WA scheduling message) transmission. As such, for example, a scheduling message received from a base station for an active service period may close the active service period before the triggering of a new service period.

At operation 2, an indication that the service period termination field 17 is set to 2 may denote that the local area service period is terminated by messages exchanged between devices in a local area network or at the beginning of a WA data transmission (e.g., a CoMP WA data transmission) by one or more devices of a local area network to a base station (e.g., base station 510), whichever occurs earlier. In this regard, in one example embodiment, in operation 2, a local area service period(s) may be terminated when a WA data transmission starts. The devices (e.g., terminal apparatuses TA1, TA2, TA3, TA4) of the local area network may obtain from the scheduling message (e.g., a WA scheduling message) the exact instant of time when WA data is transmitted. In this regard, in an instance in which a service period is not terminated before this time, the service period may be terminated at the time of a WA data transmission, for example, a transmission of data to a base station. It should be pointed out that the triggering and termination of the service periods may use different periodicity of the scheduling messages.

At operation 3, an indication that the field is set to 3 may denote that the service period in the local area is terminated by messages exchanged in the local area or by reception of a specific bit in the scheduling message, whichever occurs earlier. In operation 3, the scheduling messages having a specific bit set may terminate the local area service periods as opposed to operation 1 in which all scheduling messages, (e.g., not having a specific bit for termination) terminates the local area service periods.

It should be pointed out that in one example embodiment the same scheduling message may both terminate a service period (e.g., an existing service period) and trigger a service period (e.g., a new service period).

Referring now to FIG. 11 a diagram illustrating data flow transmissions between a wide area network and local area network is provided according to an example embodiment. The data transmissions may, but need not, be CoMP data transmissions or any other suitable data transmissions. In the example embodiment of FIG. 11, one or more devices the local area (e.g., a local area network) may transmit newly received data, from a base station of the wide area, among each other. During a next scheduled transmission, the devices of the local area network may transmit data (e.g., CoMP transmission data) to the base station (e.g., base station 510) of the wide area.

Referring now to FIG. 12, an example embodiment of a flowchart for triggering generation of a service period(s) in a local area is provided. At operation 1200, an apparatus (e.g., apparatus 50 (e.g., terminal apparatus TA1)) may trigger generation of at least one service period in a first network (e.g., a local area network (e.g., LAN 520)) based in part on receipt of information from a network device (e.g., a base station 510) of a second network (e.g., a wide area network). The generated service period may wake up one or more devices (e.g., terminal apparatuses TA1, TA2, TA3, TA4) of the first network for communication of content to at least one of the devices during a specified time period of the service period. Optionally, at operation 1205, an apparatus (e.g., apparatus 50 (e.g., apparatus TA1)) may enable provision of data to the at least one device (e.g., at least one of the terminal apparatuses TA2, TA3, TA4) on behalf of the network device (e.g., base station 510) during the time period of the service period. In one example embodiment, the apparatus (e.g., apparatus 50 (e.g., apparatus TA1) may receive and/or transmit data to/from other devices (e.g., terminal apparatuses TA2, TA3, TA4) during a service period(s). In another alternative example embodiment, there may not necessarily be any data transmission during the service period.

Referring now to FIG. 13, another example embodiment of a flowchart for triggering generation of a service period(s) in a local area is provided. At operation 1300, an apparatus (e.g., network device 90 (e.g., base station 510)) may enable provision, via a first network (e.g., a wide area network), of information to one or more devices (e.g., terminal apparatus TA1, TA2, TA3, TA4) of a second network (e.g., a local area network (e.g., LAN 520)) to cause triggering of generation of at least one service period in the second network upon receipt of the information by the devices. The generated service period may wake up the devices of the second network for communication of content to the devices during a specified time period of the service period. Optionally, at operation 1305, an apparatus (e.g., network device 90 (e.g., base station 510)) may instruct at least one of the devices (e.g., terminal apparatus TA1) to provide data to other devices (e.g., terminal apparatus TA2, TA3, TA4) of the devices on behalf of the apparatus of the first network during the time period of the service period.

It should be pointed out that FIGS. 6, 9, 10, 12 and 13 are flowcharts of a system, method and computer program product according to an example embodiment of the invention. It will be understood that each block of the flowcharts, and combinations of blocks in the flowcharts, can be implemented by various means, such as hardware, firmware, and/or a computer program product including one or more computer program instructions. For example, one or more of the procedures described above may be embodied by computer program instructions. In this regard, in an example embodiment, the computer program instructions which embody the procedures described above are stored by a memory device (e.g., memory device 76, memory 96) and executed by a processor (e.g., processor 70, service period module 78, processor 94). As will be appreciated, any such computer program instructions may be loaded onto a computer or other programmable apparatus (e.g., hardware) to produce a machine, such that the instructions which execute on the computer or other programmable apparatus cause the functions specified in the flowcharts blocks to be implemented. In one embodiment, the computer program instructions are stored in a computer-readable memory that can direct a computer or other programmable apparatus to function in a particular manner, such that the instructions stored in the computer-readable memory produce an article of manufacture including instructions which implement the function specified in the flowcharts blocks. The computer program instructions may also be loaded onto a computer or other programmable apparatus to cause a series of operations to be performed on the computer or other programmable apparatus to produce a computer-implemented process such that the instructions which execute on the computer or other programmable apparatus implement the functions specified in the flowcharts blocks.

Accordingly, blocks of the flowcharts support combinations of means for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In an example embodiment, an apparatus for performing the methods of FIGS. 6, 9, 10, 12 and 13 above may comprise a processor (e.g., the processor 70, service period module 78, processor 94) configured to perform some or each of the operations (600-650, 0-4, 1-3, 1200-1205, 1300-1305) described above. The processor may, for example, be configured to perform the operations (600-650, 0-4, 1-3, 1200-1205, 1300-1305) by performing hardware implemented logical functions, executing stored instructions, or executing algorithms for performing each of the operations. Alternatively, the apparatus may comprise means for performing each of the operations described above. In this regard, according to an example embodiment, examples of means for performing operations (600-650, 0-4, 1-3, 1200-1205, 1300-1305) may comprise, for example, the processor 70 (e.g., as means for performing any of the operations described above), the service period module 78, the processor 94 and/or a device or circuit for executing instructions or executing an algorithm for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
receiving, at a first device of a wireless local area network, an offload data received from a cellular base station of a wide area network, the offload data offloaded from the cellular base station to the first device to enable the first device to handle transmission to the one or more second devices over the wireless local area network during a service period;
receiving, at the first device, an information from the cellular base station, the information requesting the first device to trigger the service period among a plurality of devices of the wireless local area network, wherein the plurality of devices includes the first device and one or more second devices, wherein the information enables a wake up, during the triggered service period, of the plurality of devices; and
transmitting, by the first device and over the wireless local area network, the offload data to the one or more second devices.

2. The method of claim 1, wherein the transmitting the offload data is on behalf of the cellular base station, wherein the service period comprises a period of time available for local area communications over the wireless local area network.

3. The method of claim 2, wherein the transmitting of the offload data from the first device is provided instead of transmission of the offload data from the cellular base station to the one or more second devices.

4. The method of claim 1, wherein the wide area network comprises a cellular network, and wherein the plurality of devices are associated with the cellular base station.

5. The method of claim 1, further comprising:
receiving, at the first device, an indication from the cellular base station to terminate the triggered service period; and
terminating the triggered service period based in part on the indication.

6. The method of claim 1, wherein the transmitting the offload data to the one or more second devices is on the wireless local area network, and wherein the wireless local area network comprises a mesh or ad hoc network.

7. The method of claim 1, further comprising:
transmitting, by the first device, uplink data to the cellular base station indicating that the offload data was received by the one or more second devices.

8. An apparatus comprising:
at least one processor; and
at least one memory including computer program code, the at least one memory and the computer program code configured to, with the at least one processor, cause the apparatus to at least:
receive an offload data received from a cellular base station of a wide area network, wherein the apparatus comprises, or is comprised in, a first device of a wireless local area network, the offload data offloaded from the cellular base station to the first device to enable the first device to handle transmission to the one or more second devices over the wireless local area network during a service period;
receive an information from the cellular base station, the information requesting the first device to trigger the service period among a plurality of devices of the wireless local area network, wherein the plurality of devices includes the first device and one or more second devices, and wherein the information enables a wake up, during the triggered service period, of the plurality of devices; and
transmit, over the wireless local area network, the offload data to the one or more second devices.

9. The apparatus of claim 8, wherein the offload data is transmitted on behalf of the cellular base station, wherein the service period comprises a period of time available for local area communications over the wireless local area network.

10. The apparatus of claim 9, wherein the memory and computer program code are configured to, with the processor, further cause the apparatus to at least:
terminate the triggered period based in part on completion of transmission of the offload data to the one or more second devices.

11. The apparatus of claim 9, wherein the transmitting of the offload data is provided instead of transmission of the offload data from the cellular base station to the one or more second devices.

12. The apparatus of claim 8, wherein the information comprises a service period trigger message.

13. The apparatus of claim 8, wherein the wide area network comprises a cellular network, and wherein the plurality of devices are associated with the cellular base station.

14. The apparatus of claim 8, wherein the memory and computer program code are configured to, with the processor, further cause the apparatus to at least:
receive an indication from the cellular base station to terminate the triggered service period; and
terminate the triggered service period based in part on the indication.

15. The apparatus of claim 8, wherein the memory and computer program code are configured to, with the processor, further cause the apparatus to at least:
transmit uplink data to the cellular base station indicating that the offload data was received by the one or more second devices.

16. The apparatus of claim 8, wherein the offload data is transmitted to the one or more second devices on the wireless local area network, and wherein the wireless local area network comprises a mesh or ad hoc network.

17. An apparatus comprising:
at least one processor; and
at least one memory including computer program code, the at least one memory and the computer program code configured to, with the at least one processor, cause the apparatus to at least:
provide offload data to a first device of a wireless local area network, wherein the apparatus comprises a cellular base station of a wide area network, the offload data offloaded from the cellular base station to the first device to enable the first device to handle transmission to the one or more second devices over a wireless local area network during a service period; and
provide an information to a plurality of devices of the wireless local area network, the information requesting at least one of the plurality of devices to trigger the service period among the plurality of devices in the wireless local area network, wherein the plurality of devices includes the first device and one or more second devices, and wherein the provided information wakes up, during the triggered service period, the plurality of devices for communication of the offload data from the first device to the one or more second devices.

18. The apparatus of claim 17, wherein the memory and computer program code are configured to, with the processor, further cause the apparatus to at least:
instruct at least the first device to provide, during the time period of the service period, data to other devices of the one or more second devices on behalf of the apparatus, wherein the service period comprises a period of time available for local area communications over the wireless local area network.

19. The apparatus of claim 17, wherein the memory and computer program code are configured to, with the processor, further cause the apparatus to at least:
receive, from the first device, uplink data indicating that the data was received by the one or more second devices.

20. The apparatus of claim 17, wherein the memory and computer program code are configured to, with the processor, further cause the apparatus to at least:
provide an item of information to the plurality of devices instructing the plurality of devices to terminate the triggered service period.

* * * * *